(12) United States Patent
Fournier et al.

(10) Patent No.: US 6,880,658 B2
(45) Date of Patent: Apr. 19, 2005

(54) FLEXIBLE GRAB HANDLE

(75) Inventors: Éric Fournier, Orford (CA); Jean-Rhillipe Crépeau, Bromont (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 10/361,680

(22) Filed: Feb. 11, 2003

(65) Prior Publication Data
US 2003/0150659 A1 Aug. 14, 2003

Related U.S. Application Data

(60) Provisional application No. 60/354,968, filed on Feb. 11, 2002.

(51) Int. Cl.$^7$ ............................................. B62M 27/02
(52) U.S. Cl. ........................ 180/190; 280/304.4; 16/430
(58) Field of Search ................................ 180/193, 190; 280/304.4; 16/421, 430, DIG. 12; D8/300, 303, 315

(56) References Cited

U.S. PATENT DOCUMENTS

| | | | | |
|---|---|---|---|---|
| 3,885,640 A | * | 5/1975 | Valentine et al. ............ | 180/193 |
| 4,081,182 A | * | 3/1978 | O'Brien ......................... | 482/77 |
| 4,411,222 A | * | 10/1983 | Wolfson ........................ | 2/300 |
| D294,559 S | * | 3/1988 | Schwalbach ................. | D9/434 |
| 5,237,950 A | * | 8/1993 | Abe et al. .................... | 114/55.5 |
| 5,323,511 A | * | 6/1994 | Gray ............................ | 16/422 |
| 5,700,050 A | * | 12/1997 | Gonas ..................... | 296/187.05 |
| 5,915,329 A | * | 6/1999 | Watkins et al. ............. | 114/363 |
| 5,964,172 A | * | 10/1999 | Ikeda ........................ | 114/55.57 |
| 6,145,458 A | * | 11/2000 | Hattori ..................... | 114/55.57 |
| 6,345,585 B1 | * | 2/2002 | Hovda et al. ............... | 114/362 |
| 6,675,933 B2 | * | 1/2004 | Yamaguchi ................. | 181/227 |
| 2003/0102694 A1 | * | 6/2003 | Rondeau et al. ............ | 296/195 |

FOREIGN PATENT DOCUMENTS

| EP | 000985599 A2 | * | 7/1999 | ........... B62K/19/46 |
|---|---|---|---|---|

OTHER PUBLICATIONS

1998 Ski–Doo Snowmobiles, Winter Rules.
1999 Ski–Doo Lineup, Winter Rules.

* cited by examiner

Primary Examiner—Daniel G. DePumpo
(74) Attorney, Agent, or Firm—BRP Legal Services

(57) ABSTRACT

A detachable passenger seat is selectively mountable onto a base frame of a snowmobile having a straddle-type rider seat. The passenger seat includes a cushioned seat portion supported by a seat frame. A forward portion of the passenger seat includes a bottom surface contoured to fit over and be supported by at least a portion of a rearward end of the rider seat when the passenger seat is attached to the snowmobile. Upwardly extending flexible grab handles are mounted to the lateral sides of the seat frame. Upper portions of the flexible grab handles extend higher than at least a portion of an upper surface of a cushioned seat portion of the passenger seat. The flexible grab handles are designed to be rigid enough to provide support to a passenger and flexible enough to allow a passenger to easily dismount the snowmobile.

7 Claims, 12 Drawing Sheets

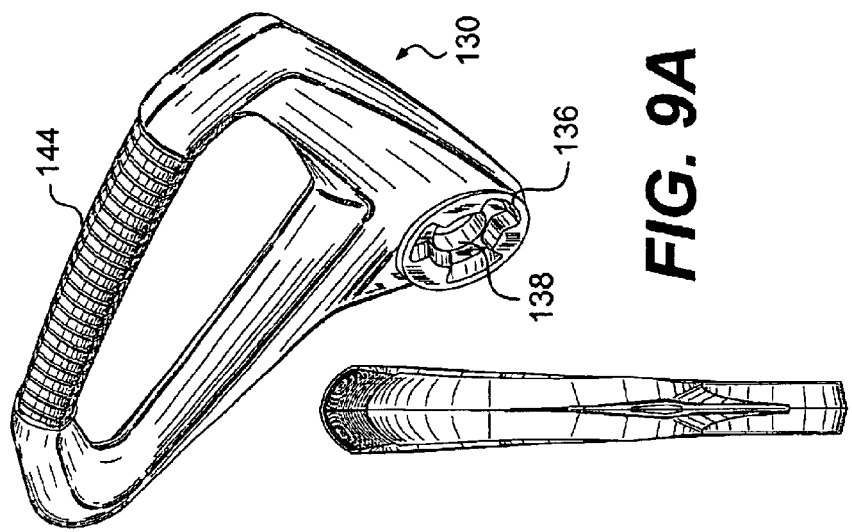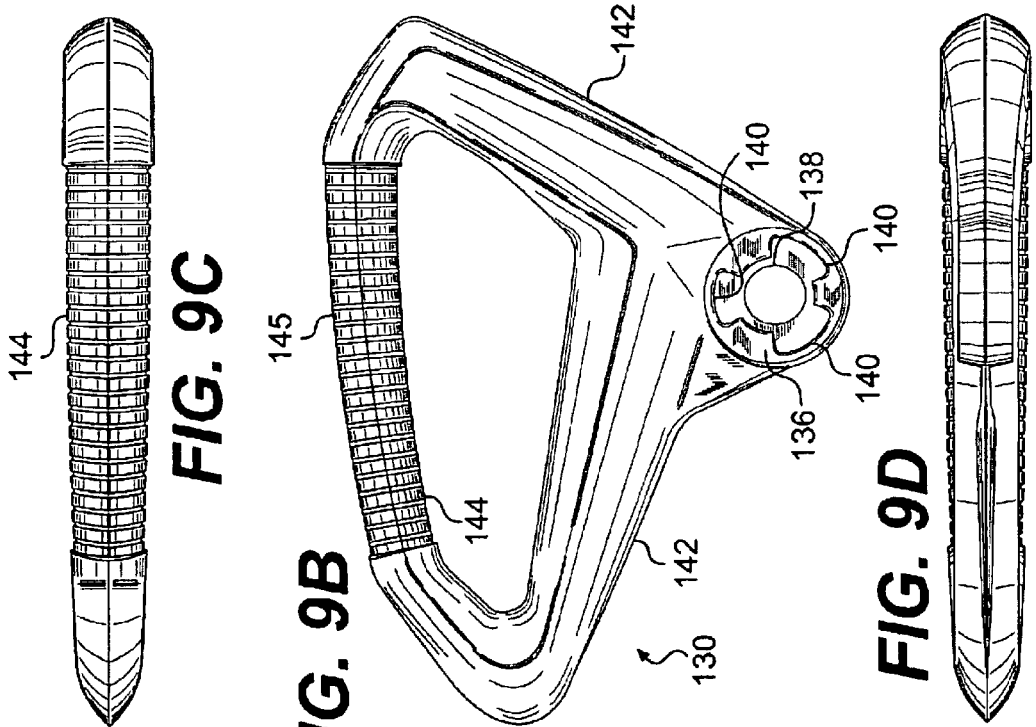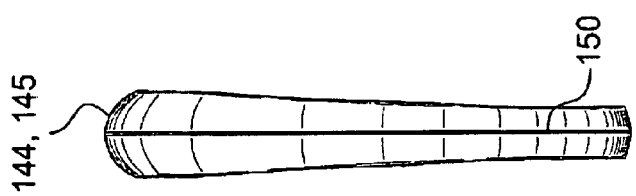

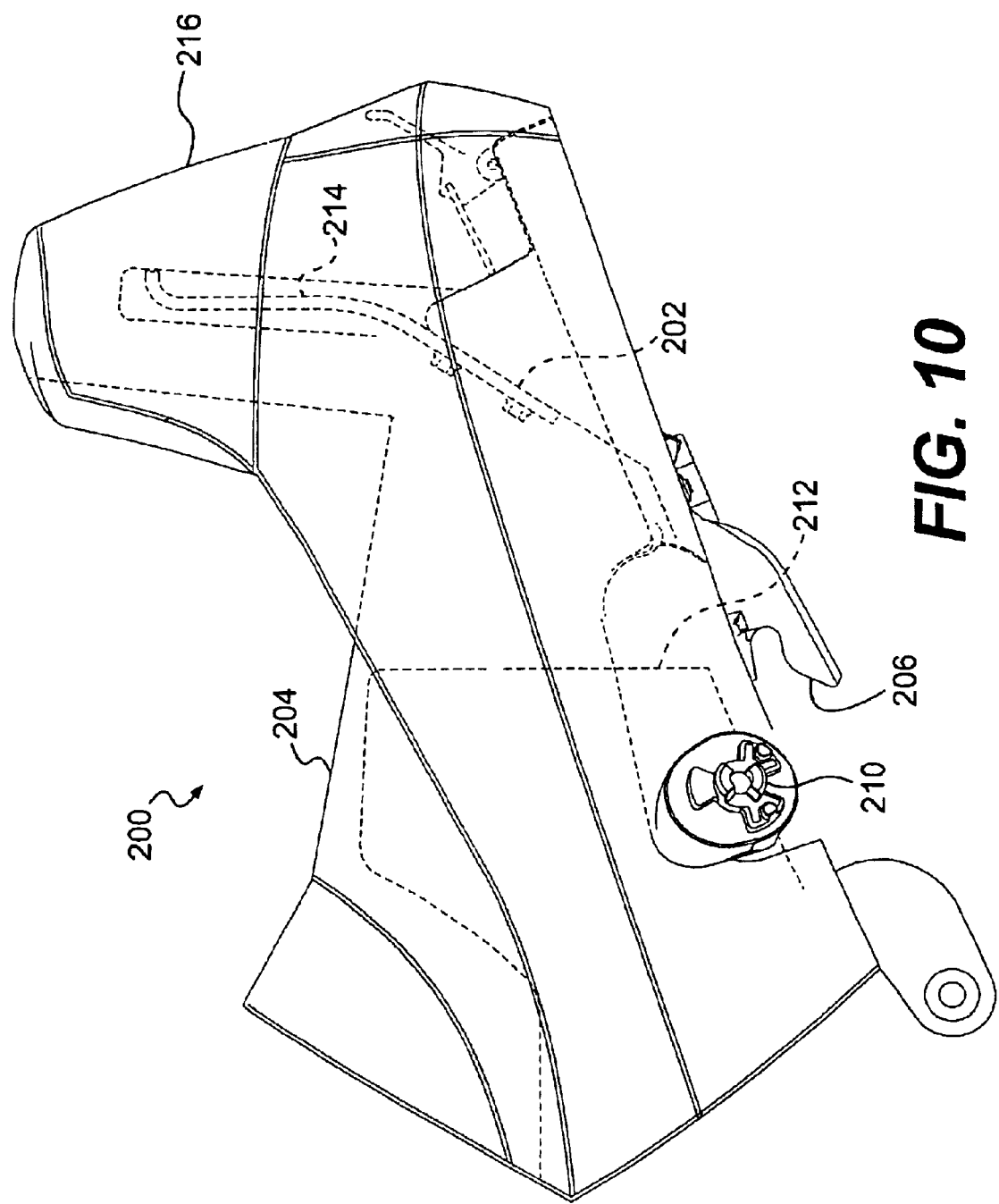

FLEXIBLE GRAB HANDLE

CROSS-REFERENCE

This application claims the benefit of priority to U.S. Provisional Patent Application No. 60/354,968 titled "QUICK RELEASE PASSENGER SEAT WITH FLEXIBLE GRAB HANDLE," filed on Feb. 11, 2002, which is incorporated herein by reference.

BACKGROUND OF THE INVENTION

1. Field of the Invention

The present invention relates generally to seating arrangements for snowmobiles.

2. Description of Related Art

Conventional snowmobiles include a straddle-type rider seat for a rider who operates the snowmobile. In many conventional snowmobiles, one or more straddle-type passenger seats are provided behind the rider seat for passengers. To increase the versatility of such snowmobiles, it is advantageous to have the one or more passenger seats be removable from the snowmobile.

In one such conventional snowmobile, an open luggage rack is disposed behind a rider seat when the snowmobile is used in its single rider configuration (one-up configuration). A passenger seat may be fit into the luggage rack to provide a seat for a second rider (the passenger) when the snowmobile is used in its two-rider configuration (one-plus-one configuration).

Many conventional snowmobiles are provided with passenger grab handles. Such grab handles are provided so that a passenger can more securely hold on to the snowmobile during operation over uneven terrain. Conventional grab handles are usually provided along the passenger seat's sides, below the seat. Because these side grab handles are disposed below the passenger's seat, a passenger must often strain himself to reach the grab handles. Further, if the passenger must stretch his arms to reach the grab handles, the passenger will experience large jolting forces because his fully extended arms cannot absorb any additional movement. Such jolting forces quickly wear out the passenger's arms.

Conventional grab handles are made of metal, which requires that their highest points be below the level of the passenger seat to prevent the passenger from either sitting on the metal handles or being trapped between the handles and the snowmobile, if the passenger ever wants to project himself from the snowmobile in a hurry (such as when the snowmobile overturns during operation).

Conventional grab handles have been more than adequate to assist a passenger, by providing hand-holds, so that the passenger can stay on the vehicle. In addition, conventional grab handles have not impeded a passenger's egress from the snowmobile in an emergency. While adequate, a demand has arisen for grab handles that are more convenient to use than the conventional example.

In addition, while the prior art provides passenger rider seats that may be fitted onto a standard luggage rack to increase the rider capacity of a snowmobile, such seats are often difficult or cumbersome to install. A demand, therefore, has arisen for a removable passenger seat that may be installed more easily on a snowmobile.

SUMMARY OF THE INVENTION

The present invention provides a straddle-type seat vehicle that is more versatile and convenient than known vehicles.

One aspect of the present invention provides a passenger seat kit mountable to a vehicle having a straddle-type rider seat. The passenger seat kit includes a base frame constructed and arranged to be mounted to the vehicle behind the rider seat, and a detachable passenger seat having attached and detached positions. The passenger seat includes a passenger seat frame that is secured to the base frame when in the attached position and is detached from the base frame when in the detached position.

The detachable passenger seat may include a cushioned seat portion connected to the passenger seat frame. The cushioned seat portion is disposed at least in part above and is supported at least in part by the rearward end of the rider seat when the passenger seat is in the attached position.

A latch mechanism may be used to releasably secure the passenger seat frame to the base frame.

The base frame may be constructed and arranged to be hidden within an enclosed storage space behind the rider seat when the passenger seat is detached.

The passenger seat kit may further include a grab handle having a mounting portion mounted to a grab handle attachment point extending laterally outwardly from the passenger seat frame. The grab handle includes a handle portion extending upwardly from the mounting portion. The handle portion is flexible and at least bends laterally outwardly relative to the mounting portion when a predetermined outwardly-directed lateral load is applied to an upper portion of the handle portion. The upper portion of the handle portion is higher than at least a portion of an upper surface of the cushioned seat portion.

An additional aspect of the present invention provides a vehicle having a selectively driven vehicle frame. A straddle-type rider seat is disposed on the frame. The above-described passenger seat kit is mounted to the vehicle frame behind the rider seat.

A further aspect of the present invention provides a grab handle mountable to a vehicle having a straddle-type passenger seat. The grab handle includes a mounting portion constructed and arranged to be mounted to the vehicle laterally-outwardly from the straddle-type passenger seat, and a handle portion extending upwardly from the mounting portion. The handle portion is flexible and at least bends laterally outwardly relative to the mounting portion when a predetermined outwardly-directed lateral load is applied to an upper portion of the handle portion. The upper portion of the handle portion is constructed and arranged to be higher than at least a portion of an upper surface of a seat portion of the passenger seat.

The mounting portion may be constructed and arranged to be mounted to the vehicle so as to prevent relative rotation and translation of the mounting portion relative to the vehicle. The handle portion may form a ring. The grab handle may be symmetrical relative to a vertically and longitudinally running center plane so that the grab handle can be mounted on either lateral side of the vehicle.

The grab handle may be mounted onto the above-described passenger seat frame or vehicle.

Additional and/or alternative objects, features, and advantages of the present invention will become apparent from the following description, the accompanying drawings, and the appended claims.

BRIEF DESCRIPTION OF THE DRAWINGS

For a better understanding of the present invention as well as other objects and further features thereof, reference is made to the following description which is to be used in conjunction with the accompanying drawings, where:

FIGS. 9A–9F are perspective, left side, top, bottom, rear, and front views, respectively, of a passenger grab handle of the snowmobile illustrated in FIG. 1;

FIG. 10 is a left side view of a passenger seat according to an alternative embodiment of the present invention;

DETAILED DESCRIPTION OF PREFERRED EMBODIMENTS OF THE INVENTION

A passenger seat 10 may be selectively attached to a snowmobile 6 such that the passenger seat 10 has attached and detached positions relative to the snowmobile 6.

Figure 1:
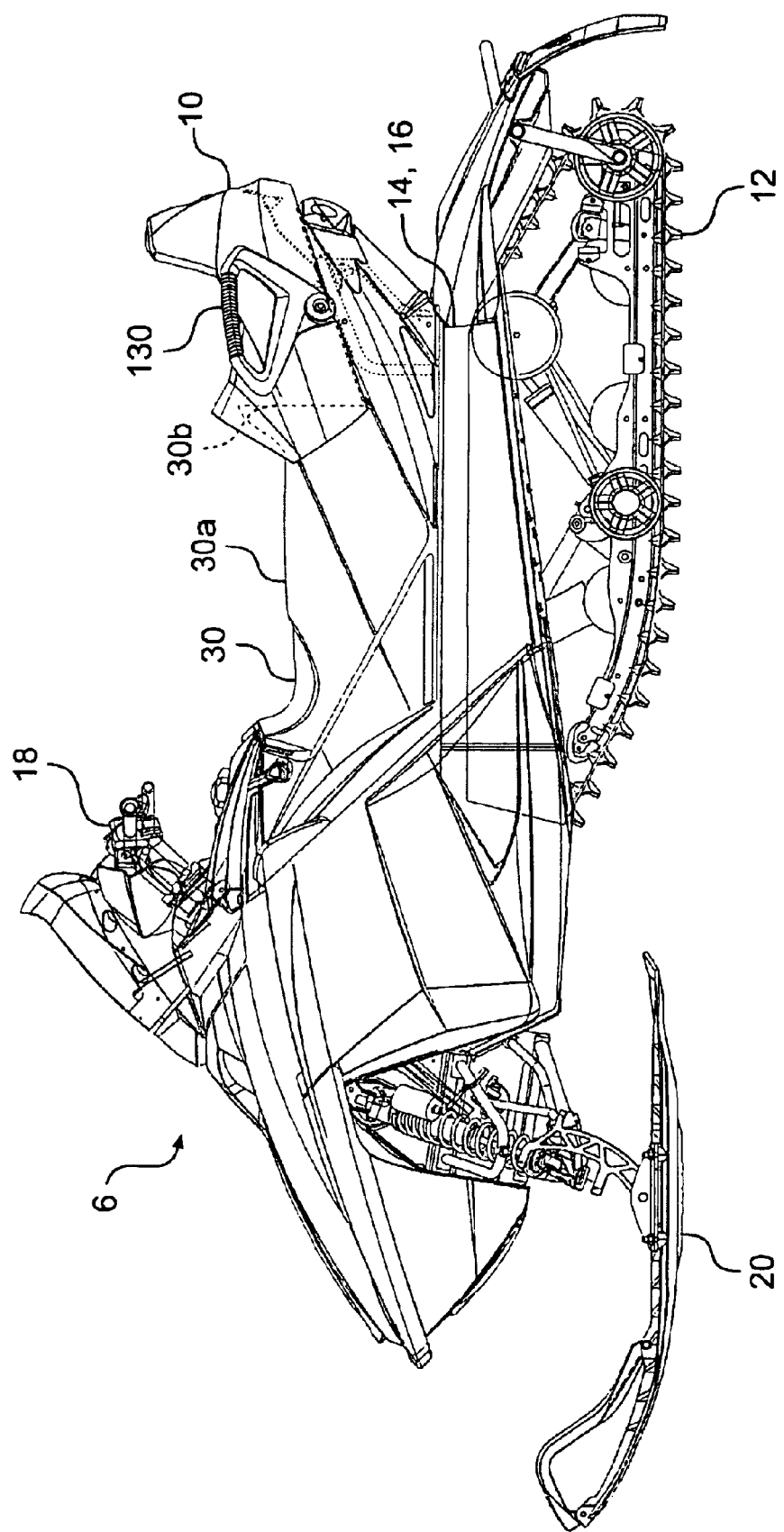
FIG. 1 is a left side view of a snowmobile with a passenger seat according to an embodiment of the present invention.

FIG. 1 is a side view of the snowmobile 6 with the passenger seat 10 in the attached position. The snowmobile 6 includes an endless drive track 12 mounted onto a tunnel 14, which forms part of a frame 16 of the snowmobile 6. A steering system includes a handlebar 18 pivotally mounted on the frame 16. To steer the snowmobile, the handlebar 18 is operatively connected to a plurality of skis 20 that are operatively connected to the frame 16.

A rider seat 30 is mounted onto the frame 16 behind the handlebar 18. The rider seat 30 is preferably a straddle-type seat, as is well known in the art. The rider seat 30 includes a middle portion 30a that is constructed and arranged to support the weight of the rider. The rider seat 30 also includes a rearward end 30b (shown in dotted lines in FIG. 1, and more clearly in FIG. 2). The rearward end 30b preferably extends upwardly from the middle portion 30a to prevent the rider from sliding backward off of the rider seat 30 during operation of the snowmobile 6.

Figure 2:
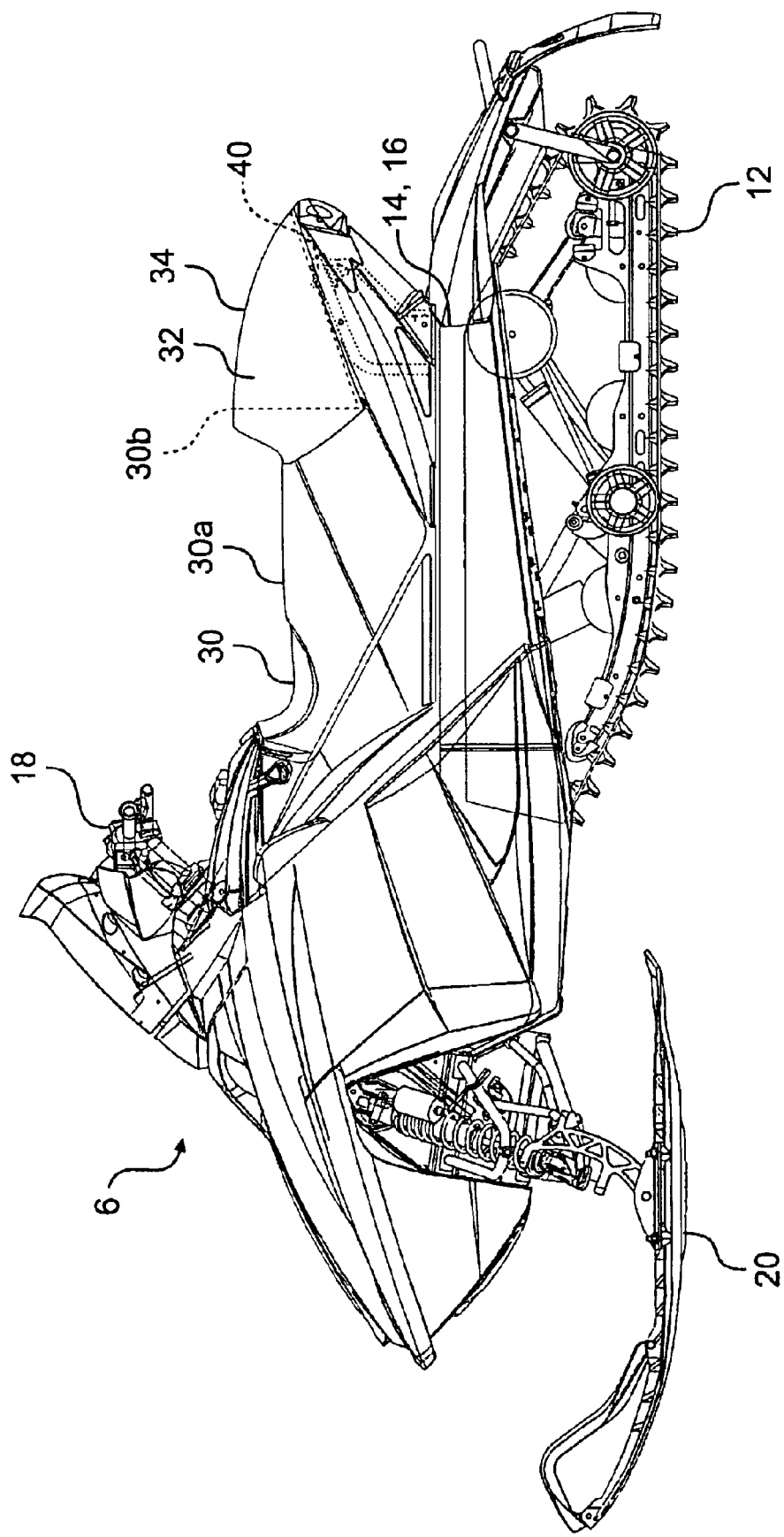
FIG. 2 is a left side view of the snowmobile illustrated in FIG. 1.

FIG. 2 is a side view of the snowmobile 6 with the passenger seat 10 detached. Without the passenger seat 10, a storage compartment 32 is accessible behind the rider seat 30. A removable storage compartment cover 34 selectively encloses the storage space within the storage compartment 32. A base frame 40 (shown in dotted lines) for the passenger seat 10 is mounted to the frame 16 within the storage compartment 32. The base frame 40 is preferably mounted to a rearward portion of the tunnel 14. When the seat 10 is detached and the storage compartment cover 34 is attached and closed, the base frame 40 is hidden within the storage compartment 32.

It should be noted that the storage compartment 32 may be accessed upon removal of storage compartment cover 34 or passenger seat 10. In other words, regardless of the configuration chosen, the storage compartment 32 is accessible.

Figure 3:
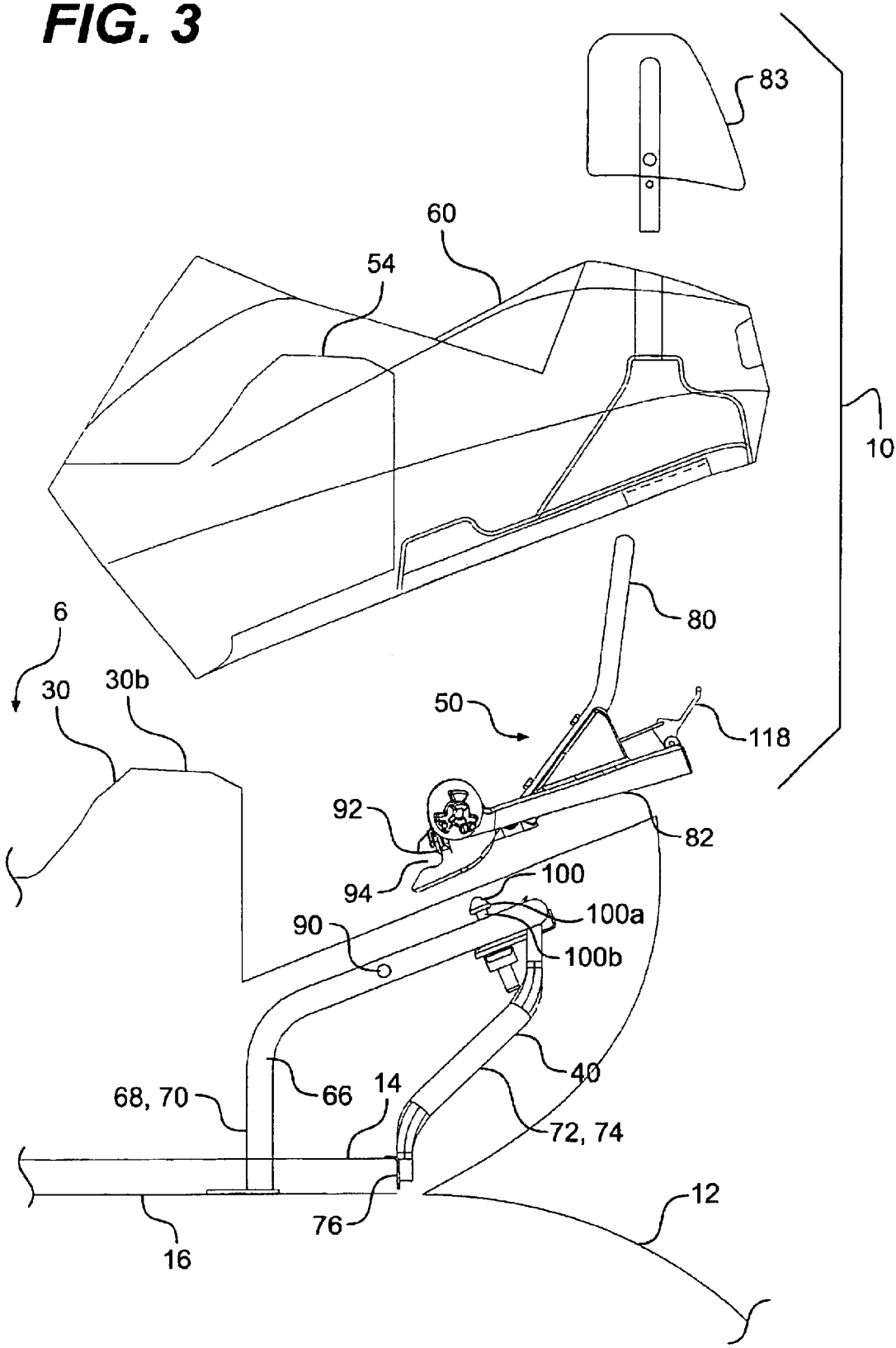
FIG. 3 is an exploded, partial side view of the snowmobile illustrated in FIG. 1.

FIG. 3 is an exploded, partial left side view of the passenger seat 10, base frame 40, and snowmobile 6. The passenger seat 10 includes a passenger seat frame 50 that is secured to the base frame 40 when the passenger seat 10 is attached to the snowmobile 6. Conversely, the passenger seat frame 50 is detached from the base frame 40 when the passenger seat 10 is detached from the snowmobile 6.

The passenger seat 10 also includes a forward portion 54 defining a bottom surface contoured to fit over and be supported by at least a portion of the rearward end 30b of the rider seat 30 when the passenger seat 10 is in the attached position. When the passenger seat 10 is attached to the snowmobile 6, the forward portion 54 of the passenger seat 10 mates with the outer surface of the rearward portion 30b of the rider seat 30. The mating engagement of the forward portion 54 to the rearward portion 30b preferably helps to keep the passenger seat 10 secured to the rider seat 30.

The passenger seat 10 further includes a cushioned seat portion 60 connected to the passenger seat frame 50. The cushioned seat portion 60 preferably includes a foam core surrounded by a flexible cover such as leather, vinyl, or plastic. The flexible cover is mounted to the passenger seat frame 50. The passenger seat frame 50 provides structure and support to the cushioned seat section 60. Accordingly, the cushioned seat portion 60 can support the weight of a passenger by transferring the load at least partially to the passenger seat frame 50.

The cushioned seat portion 60 is disposed, at least in part, above the forward portion 54 of the passenger seat 10 and the rearward portion 30b of the rider seat 30 when the passenger seat 10 is attached to the snowmobile 6. As a result, the cushioned seat portion 60 is at least partially supported by the rearward portion 30b of the rider seat 30 such that at least a portion of the weight of the passenger is transferred from the cushioned seat portion 60, through the forward portion 54, and into the rearward portion 30b of the rider seat 30.

Figure 4:
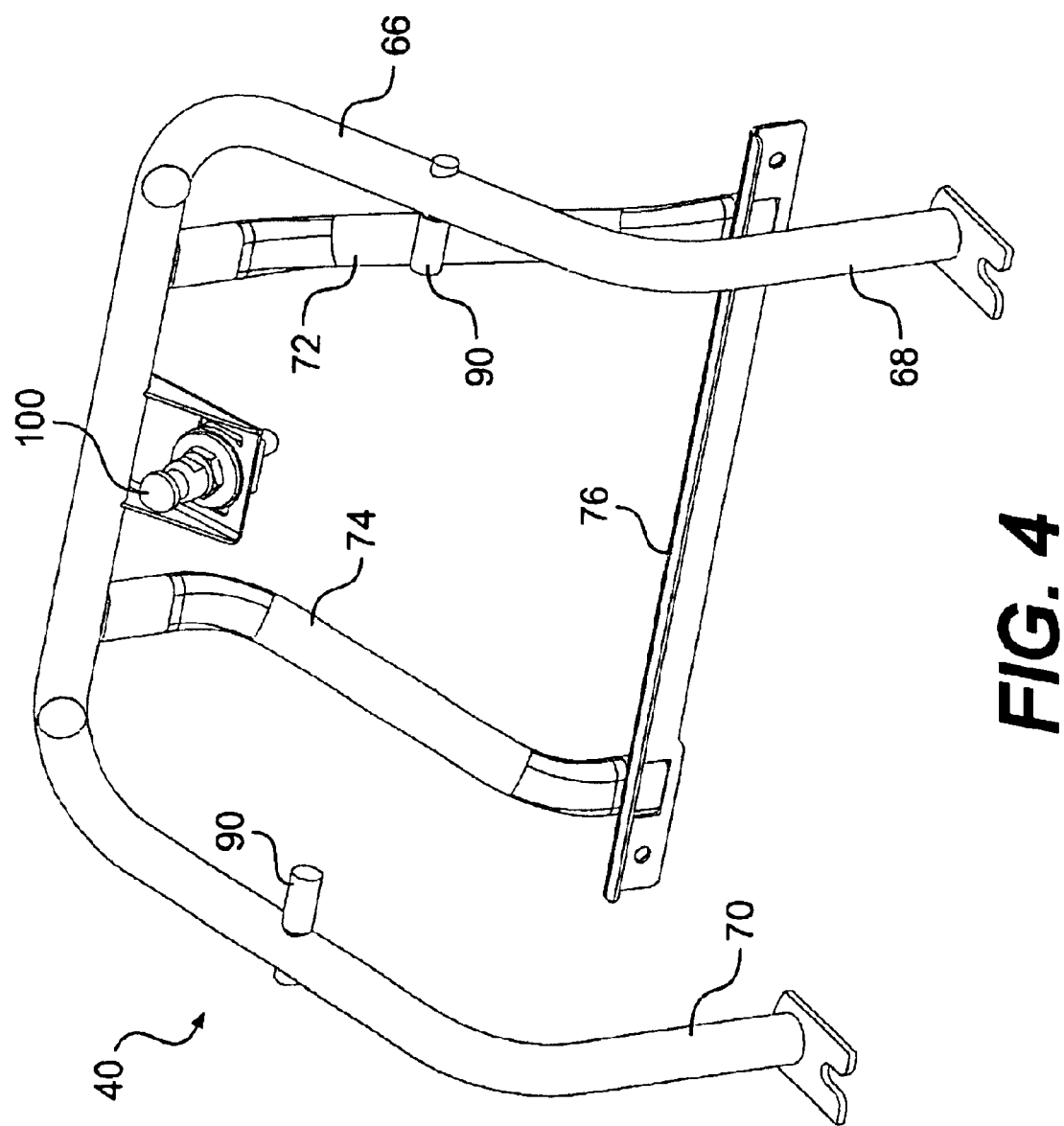
FIG. 4 is a perspective view of the base frame of the snowmobile illustrated in FIG. 1, viewed from the forward, left side.

As illustrated in FIGS. 3 and 4, the base frame 40 extends upwardly from the frame 16 to provide an elevated mounting structure onto which the passenger seat 10 may be securely attached on the passenger seat frame 50. In this embodiment, the base frame 40 includes an upside-down U-shaped portion 66. The U-shaped portion 66 has first and second legs 68, 70 that have ends that are constructed and arranged to be mounted to the snowmobile's frame 16. For example, as shown in FIG. 3, the legs 68, 70 may be attached to the tunnel 14 of the frame 16 via bolts or other suitable fasteners. The base frame 40 also includes third and fourth legs 72, 74 that extend downwardly from the U-shaped portion and are constructed and arranged to be mounted to the frame 16. A base cross-piece 76 is connected between lower ends of the third and fourth legs 72, 74. The base cross-piece 76 is bent along its longitudinal axis such that it fits over and can be easily mounted to a rear end of the tunnel 14, as is best illustrated in FIG. 3.

Figure 5:
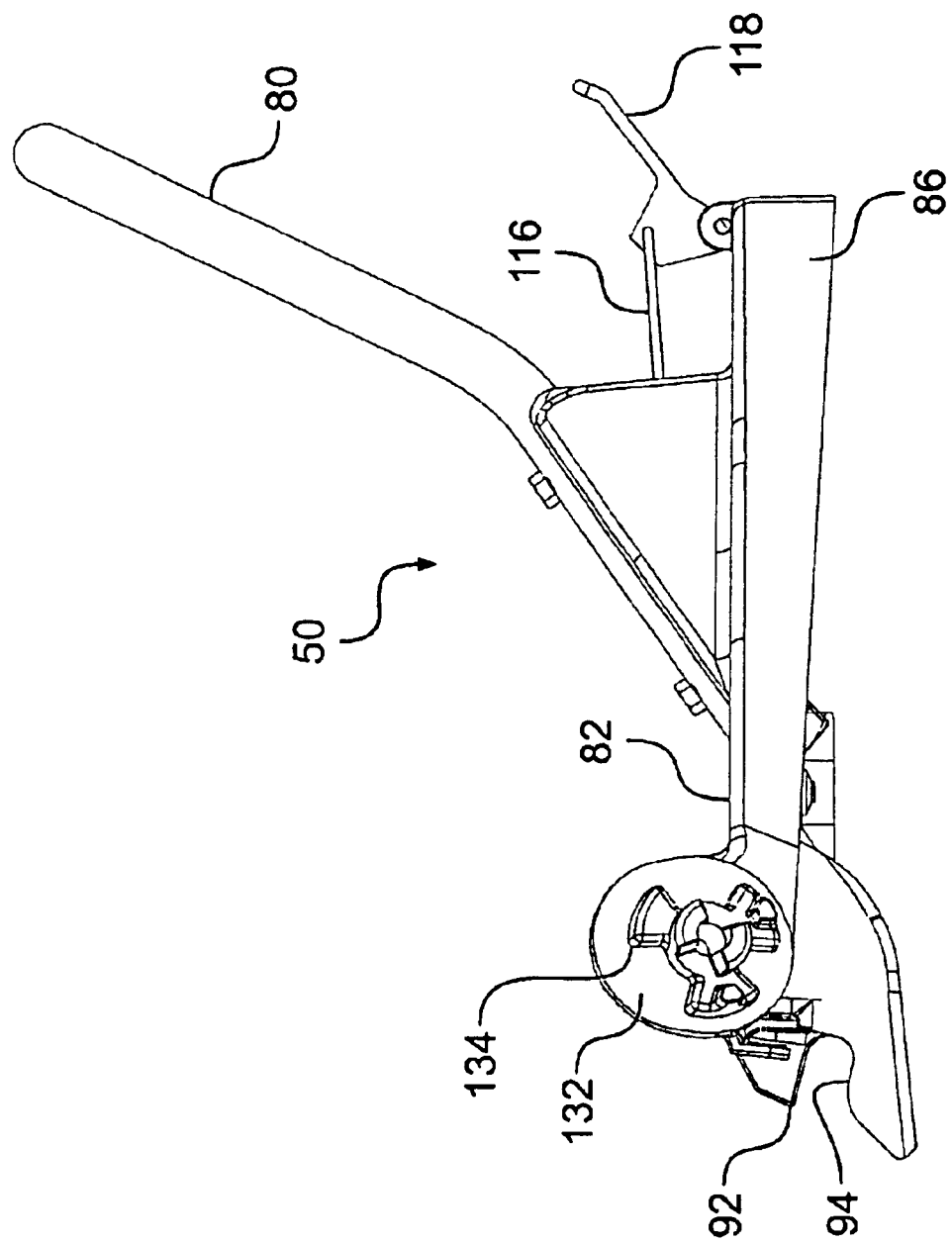
FIG. 5 is an enlarged side view of a seat frame of the snowmobile illustrated in FIG. 1.
Figure 6:
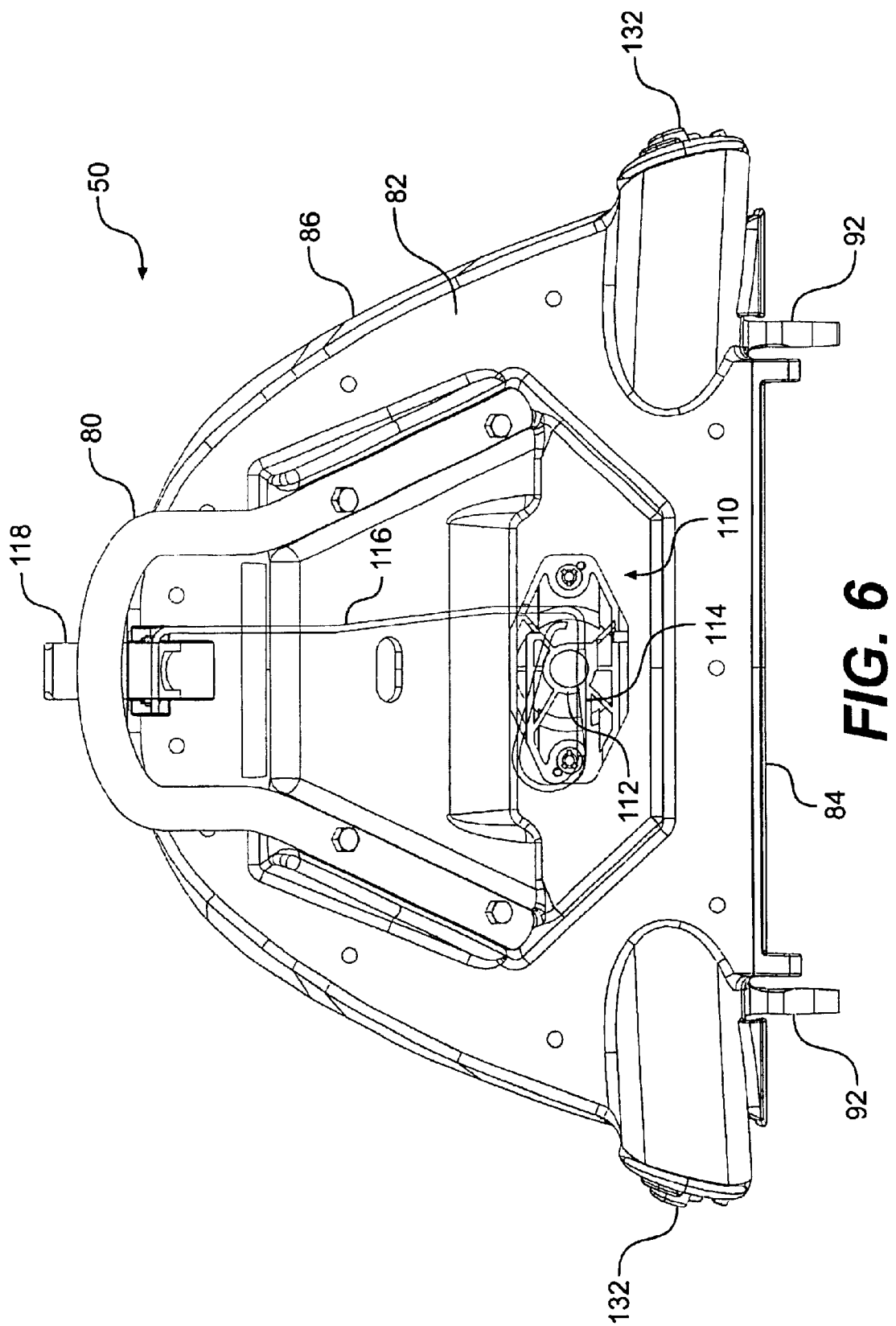
FIG. 6 is a top view of the seat frame illustrated in FIG. 5.
Figure 7:
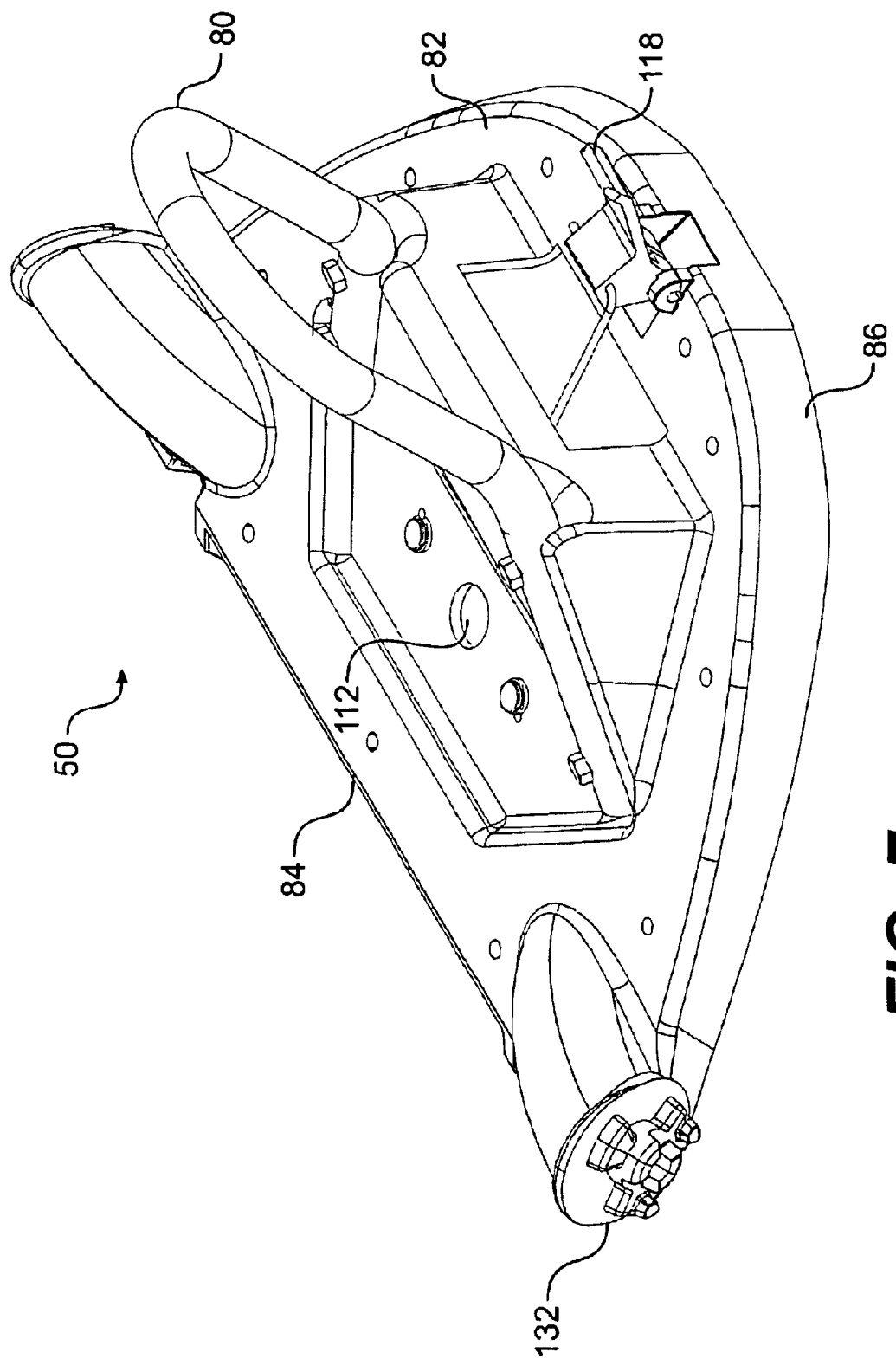
FIG. 7 is a perspective view of the seat frame illustrated in FIG. 5, viewed from the rear left side.

FIGS. 5–7 are left side, top, and perspective views, respectively, of the passenger seat frame 50. In this embodiment, an upside-down U-shaped arm 80 extends upwardly and rearwardly from a main section 82 of the passenger seat frame 50 to provide support to a rearward portion of the cushioned seat section and the backrest 83. The main section 82 comprises a, light material such as sheet aluminum or molded plastic and has a laterally extending front edge 84. A side and rearward edge 86 curves from one lateral side to the other to provide a trailing edge to the passenger seat 10 that follows the lines of the snowmobile 6. The flexible material of the cushioned seat section 60 is stretched over the edges 84, 86 and attached to the main section 82 to attach the cushioned seat portion 60 to the passenger seat frame 50.

The arm 80, legs 68, 70, 72, 74, and U-shaped portion 66 preferably comprise strong, light tubular members. Aluminum is one example of the material that may be selected.

A latch mechanism selectively secures the passenger seat frame 50 to the base frame 40. In this embodiment, the latch mechanism includes a separable hinge. The separable hinge includes two laterally-oriented pins 90 mounted to the U-shaped portion 66 of the base frame 40 (see FIGS. 3 and 4) and two corresponding forked yokes 92 mounted near the lateral ends of the arm 80 and to the main section 82 of the passenger seat frame 50 (see FIGS. 3, 5, and 6). The forked yokes 92 define grooves 94 with which the pins 90 matingly engage. When the pins 90 are fit into the grooves 94 of the forked yokes 92, the passenger seat frame 50 may pivot relative to the base frame 40 about an axis defined by the pins 90, but may not move relative to the base frame 40 in a direction perpendicular to the grooves 94. While in the illustrated embodiment, the pins 90 are disposed on the base frame 40 and the forked yokes 92 are disposed on the passenger seat frame 50, the pins 90 may alternatively be disposed on the passenger seat frame 50 with the forked yokes 92 disposed on the base frame 40.

The latch mechanism also preferably includes a quick release mechanism selectively connecting the base frame 40 to the passenger seat frame 50. In this embodiment, the quick release mechanism includes an upwardly-extending male end (or pin) 100 mounted to the base frame 40. The pin 100 has an enlarged end portion 100a and a narrowed intermediate portion 100b (see FIG. 3). The main section 82 of the seat frame 50 includes a female end 110 (see FIG. 6). The female end 110 has a hole 112 through which the pin 100 is adapted to fit when the yokes 92 engage the pins 90 and the seat frame 50 is rotated downwardly about the pins 90.

The female end 110 also includes a latch 114 that selectively engages the narrowed intermediate portion 100b of the pin 100 when the passenger seat 10 is in the attached position. Because the latch 114 is biased toward a position in which it engages the pin 100, the latch 114 automatically engages the pin 100 when the passenger seat 10 is rotated into the attached position. The latch 114 is operatively connected to a connecting member 116. In this embodiment, the latch 114 and connecting member 116 are integrally formed. A quick release lever 118 is movably connected to the seat frame 50 and operatively connected to the connecting member 116. In the illustrated embodiment, the lever 118 is pivotally mounted to the seat frame 50 at a rearward portion of the seat frame 50. When the seat frame 50 is attached to the base frame 40, selective actuation of the lever 118 moves the connecting rod 116 and latch 114, thereby disengaging the latch 114 from the pin 100 and allowing the seat 10 to be detached from the base frame 40.

In the illustrated embodiment, the quick release lever 118 is disposed underneath the flexible material covering the seat 10. The lever 118 is therefore discretely disposed within the passenger seat 10. To actuate the lever 118 and release the seat frame 50 and seat 10, a user pushes the lever 118 through the flexible cover from behind the seat 10.

In the illustrated embodiment, the pin 100 is disposed on the base frame 40 and the female end 110 is disposed on the seat frame 50. However, the pin 100 may alternatively be disposed on the seat frame 50 with the female end 110 disposed on the base frame 40.

Figure 8:
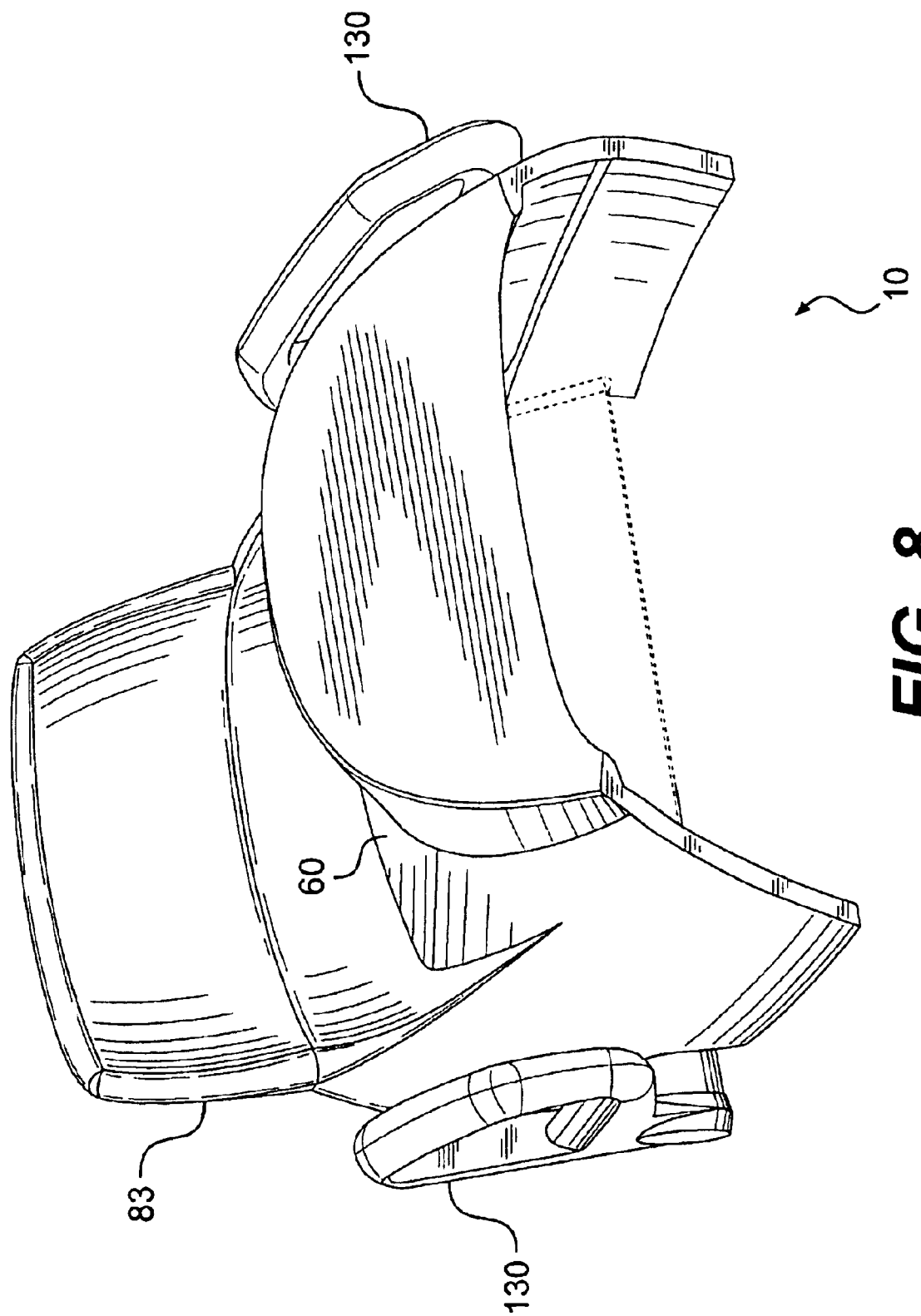
FIG. 8 is a partial perspective view of the passenger seat of the snowmobile illustrated in FIG. 1, viewed from the forward right side.

As illustrated in FIGS. 8 and 9, a flexible grab handle 130 is attached to each lateral side of the passenger seat 10. A grab handle attachment point 132 extends outwardly from each lateral side of the seat frame 50 (see FIGS. 5–7). The attachment point 132 preferably has surface features such as axially and radially extending splines (or protrusions) 134 (see FIG. 5). The grab handle 130 includes a mounting portion 136 constructed and arranged to be mountable to the attachment point 132 of the seat frame 50. A laterally extending bore 138 extends through the mounting portion 136. A bolt (or other fastening device) extends through the bore 138 and threads into the attachment point 132 to secure the grab handle 130 to the seat frame 50. The mounting portion 136 of the grab handle 130 preferably includes surface features that are constructed and arranged to mesh with the surface features of the attachment point 132 to prevent the mounting portion 136 from rotating about the axis of the bore 138 relative to the attachment point 132 when the grab handle 130 is attached to the seat frame 50. In this embodiment, the surface features of the mounting portion 136 include a plurality of notches (or splines) 140 extending radially outwardly from the bore 138. The notches 140 mate with the splines 134 of the attachment point 132 to prevent the grab handle 130 from rotating. Consequently, when the grab handle 130 is mounted to the seat frame 50, the mounting portion 136 cannot rotate or translate relative to the seat frame 50 and a passenger can use the grab handles 130 to prevent himself from sliding forward and backward along the passenger seat 10.

The grab handle 130 includes a handle portion 142 that extends upwardly from the mounting portion 136. The handle portion 142 is preferably ring-shaped and includes a hand-hold (or upper portion) 144 at an upper end thereof. The hand-hold 144 is preferably generally straight such that the ring is generally D-shaped. The hand-hold 144 may be smooth (see FIG. 8) or include texturing 145 (see FIG. 9) to facilitate gripping of the grab handle 130 by a passenger. When the grab handle 130 is mounted to the seat 10, the longitudinally-elongated hand-hold 144 preferably extends generally along the longitudinal (front/back) direction of the snowmobile 6. As illustrated in FIG. 8, the hand-holds 144 also preferably extend slightly laterally outwardly and downwardly as they extend forwardly relative to the seat 10.

As illustrated in FIG. 1, when the grab handle 130 is mounted to the seat 10 and the seat 10 is mounted to the snowmobile 6, an upper end of the hand-hold 144 is higher than at least a portion of an upper surface of the seat section 60 of the seat 10. Consequently, a passenger sitting on the seat portion 60 can easily grab the hand-hold 144 of the grab handle 130 without fully extending his arms. The passenger's remaining arm extension can therefore be used to absorb jostling forces as the snowmobile 6 traverses uneven terrain.

The handle portion 142 is flexible and at least bends laterally outwardly relative to the mounting portion 136 when a predetermined outwardly-directed lateral load is applied to the hand-hold 144. The predetermined load is preferably sufficiently small that the grab handle 130 does not restrict a passenger from rolling sideways off of the snowmobile 6 if the snowmobile 6 rolls over. Consequently, the grab handle 130 provides support to a passenger without restricting the passenger's ability to free himself from the snowmobile 130.

The handle portion 142 is also preferably designed to compress downwardly at least to some extent if a passenger accidentally sits on the grab handle 130 instead of the seat portion 60. However, the grab handle 130 is also preferably rigid enough that a passenger can use the grab handles 130 to lift himself up off of the seat 10.

The grab handle 130 is preferably blow molded and hollow so as to provide the needed flexibility. The material forming the grab handle 130 is preferably a resilient material such as rubber or plastic.

Because the grab handle 130 is symmetric relative to a vertically and longitudinally running center plane 150 (see FIG. 9E), any grab handle 130 may be mounted to either the right or left attachment point 132 of the seat frame 50.

The grab handle 130 may also be equipped with wind deflectors and/or electric heating elements.

While the illustrated grab handle 130 is disposed on a removable passenger seat 10, the grab handle 130 may alternatively be disposed in a fixed location on a conventional snowmobile without departing from the scope of the present invention. For example, the grab handle 130 could be attached to a running board of a conventional snowmobile laterally outwardly from the straddle-type seat. Depending upon the specific location of the attachment point, the handle portion 142 may be elongated or shortened so as to extend up to and/or above the seat portion on either lateral side of a passenger who is intended to use the grab handles 130.

Figure 11:
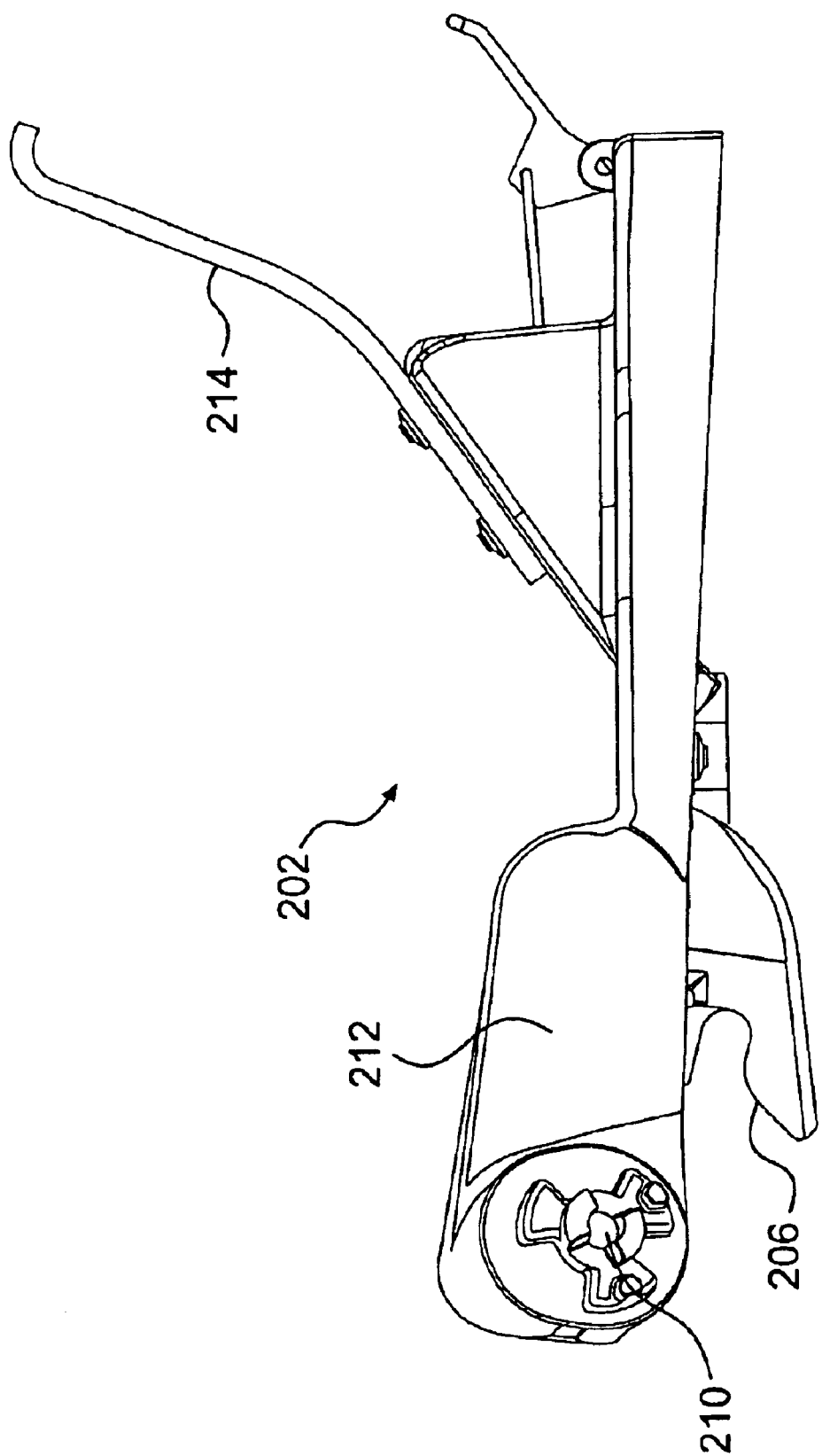
FIG. 11 is an enlarged side view of a seat frame of the passenger seat illustrated in FIG. 10.
Figure 12:
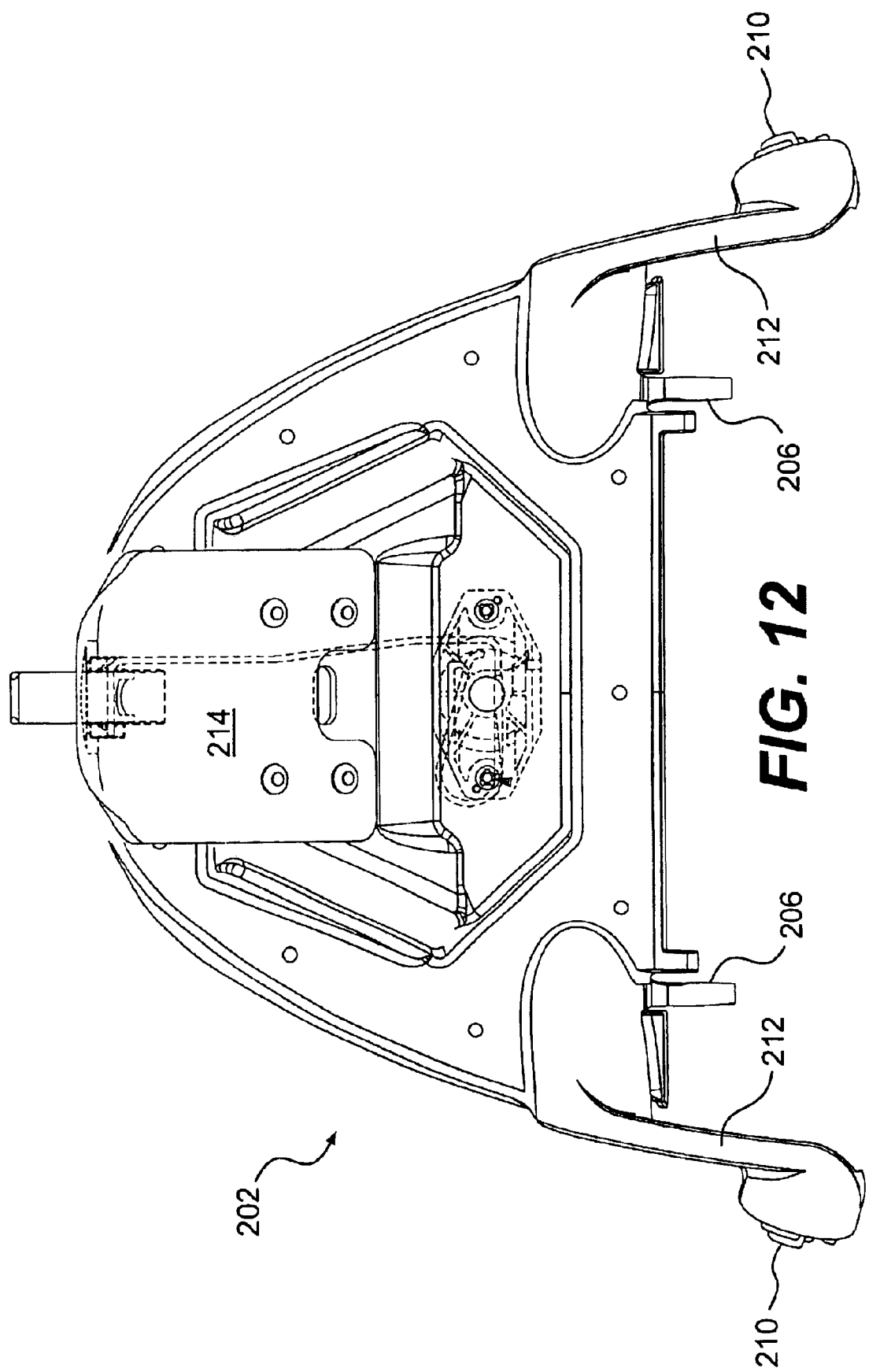
FIG. 12 is a top view of the seat frame illustrated in FIG. 11.

FIGS. 10–12 illustrate an alternative passenger seat 200, which may replace the passenger seat 10 of the previous embodiment without departing from the scope of the present invention. As best illustrated in FIG. 10, the passenger seat 200 includes a passenger seat frame 202 and a cushioned seat portion 204 mounted to the passenger seat frame 202. As illustrated in FIGS. 11 and 12, the passenger seat frame 202 is similar to the passenger seat frame 50 of the previously described embodiment. Accordingly, a redundant description of the identical features is not provided.

The passenger seat frame 202 includes forked yokes 206 that are positioned more rearwardly on the passenger seat frame 202 than the forked yokes 92 on the passenger seat frame 50. To position the grab handles 130 at a comfortable longitudinal position for the passenger sitting on the passenger seat 200, the grab handle attachment points 210 are preferably disposed on frame extensions 212 that extend forwardly from the remainder of the passenger seat frame 202. While not shown, a base frame designed for use with the passenger seat frame 202 is modified relative to the base frame 40 by moving the pins 90 (see FIG. 4) rearwardly to properly mate with the forked yokes 92.

The passenger seat frame 202 includes an upper backrest supporting member 214 instead of the upside-down U-shaped, tubular arm 80 that is included in the previous embodiment. The backrest supporting member 214 is preferably made of a strong, slightly flexible, sheet of high density poly-ethylene material (HDPE) that is bolted, glued, screwed, or otherwise mounted to the rest of the passenger seat frame 202. The slight flexibility of the backrest supporting member 214 supports a cushioned backrest 216 of the cushioned seat portion 204. The backrest supporting member 214 enables the cushioned backrest 216 to flex when the snowmobile 6 accelerates so that the passenger's back does not arch as much. The backrest supporting member 214 also allows for some deflection of the cushioned backrest 216 if the passenger accidentally falls on or sits on the corner of the cushioned backrest 216. However, it should be noted that the backrest supporting member 214 should still be stiff enough that it prevents the passenger from falling backward off of the snowmobile 6 during acceleration.

While the vehicle illustrated in these embodiments of the present invention is a snowmobile 10, the detachable passenger seat 10, 200 may be used on a variety of straddle-type seat vehicles. For example, the detachable seat 10, 200 may be used with an all-terrain vehicle (ATV) or a personal watercraft (PWC) without departing from the scope of the present invention.

The foregoing illustrated embodiments are provided to illustrate the structural and functional principles of the present invention and are not intended to be limiting. To the contrary, the principles of the present invention are intended to encompass any and all changes, alterations and/or substitutions within the spirit and scope of the following claims.

What is claimed is:

1. A snowmobile comprising:
   a frame including a tunnel;
   an engine disposed on the frame;
   a drive track disposed below and supported by the tunnel and operatively connected to the engine for propulsion of the snowmobile;
   two skis disposed on the frame, each via a front suspension;
   a driver straddle seat disposed on the tunnel above the drive track and rearward of the engine;
   a passenger straddle seat for a passenger disposed on the tunnel rearward of the driver straddle seat, the passenger straddle seat having a seat portion that includes an upper surface;
   a steering device disposed on the frame forward of the driver seat;
   a left grab handle and a right grab handle for the passenger disposed on a respective side of the passenger seat such that the passenger, when seated on the passenger seat, will be seated between the grab handles; each grab handle including a flexible handle portion that at least bends laterally outwardly when a predetermined outwardly-directed lateral load is applied to the handle portion, the handle portion of each grab handle including an upper portion that is higher than at least a portion of the upper surface of the seat portion.

2. The snowmobile of claim 1, wherein the grab handles each further include a mounting portion mounted to the snowmobile laterally-outwardly from the passenger seat, and the hands portion extends upwardly from the mounting portion.

3. The snowmobile of claim 2, wherein the mounting portion is mounted on the snowmobile so as to prevent relative rotation and translation of the mounting portion relative to the snowmobile.

4. The snowmobile of claim 3, wherein the mounting portion comprises:
   a laterally extending bore; and
   at least one notch extending radially from the bore, the at least one notch being constructed and arranged to mate with at least one protrusion extending from the snowmobile.

5. The snowmobile according to claim 1, wherein the handle portion forms a ring.

6. The snowmobile according to claim 1, wherein the grab handle is symmetrical relative to a vertically and longitudinally running center plane.

7. The snowmobile according to claim 1, wherein the handle portion is blow-molded and hollow.

* * * * *